(12) United States Patent
Singh et al.

(10) Patent No.: US 12,518,205 B2
(45) Date of Patent: Jan. 6, 2026

(54) ARTIFICIAL INTELLIGENCE/MACHINE LEARNING MODEL DECISIONING AND RECTIFICATION SYSTEM

(71) Applicant: Bank of America Corporation, Charlotte, NC (US)

(72) Inventors: Shailendra Singh, Maharashtra (IN); Durga Prasad Kutthumolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 948 days.

(21) Appl. No.: 17/686,072

(22) Filed: Mar. 3, 2022

(65) Prior Publication Data

US 2023/0281503 A1    Sep. 7, 2023

(51) Int. Cl.
| | | |
|---|---|---|
| *G06N 20/00* | (2019.01) | |
| *G06F 16/909* | (2019.01) | |
| *G06F 18/40* | (2023.01) | |

(52) U.S. Cl.
CPC ........... *G06N 20/00* (2019.01); *G06F 16/909* (2019.01); *G06F 18/40* (2023.01)

(58) Field of Classification Search
CPC ...... G06N 20/00; G06N 10/60; G06F 16/909; G06F 16/906; G06F 18/40; G06F 18/217
See application file for complete search history.

(56) References Cited

U.S. PATENT DOCUMENTS

| | | | |
|---|---|---|---|
| 7,386,528 B2 | 6/2008 | Maloche et al. | |
| 7,499,882 B2 | 3/2009 | Cole | |
| 8,639,618 B2 | 1/2014 | Yan et al. | |
| 11,854,011 B1* | 12/2023 | Prasad | H04L 9/50 |
| 2005/0027755 A1* | 2/2005 | Shah | G06F 3/065 |
| 2009/0299896 A1 | 12/2009 | Zhang et al. | |
| 2013/0326359 A1* | 12/2013 | Beckert | H04W 4/50 |
| | | | 715/744 |
| 2014/0143134 A1 | 5/2014 | Yan et al. | |
| 2018/0314981 A1* | 11/2018 | Chen | G06F 9/5072 |
| 2020/0134493 A1* | 4/2020 | Bhide | G06N 5/048 |
| 2020/0175424 A1* | 6/2020 | Kursun | G06N 20/20 |
| 2020/0374305 A1* | 11/2020 | Kursun | G06N 5/047 |
| 2021/0056569 A1* | 2/2021 | Silberman | G06N 7/01 |

(Continued)

OTHER PUBLICATIONS

Xu, "Resource allocation based on quantum particle swarm optimization and RBF neural network for overlay cognitive OFDM System", Neurocomputing 173 (2016) 1250-1256. (Year: 2016).*

(Continued)

*Primary Examiner* — Dave Misir

(74) *Attorney, Agent, or Firm* — Banner & Witcoff, Ltd.

(57) ABSTRACT

An artificial intelligence/machine learning (AI/ML) model decisioning and rectification system is configured to allow a user to challenge decisions output by systems processing AI/ML models. The user interacts with the AI/ML model decisioning and rectification system, directly or via another computing device, to trigger AI/ML training data acquisition from multiple regional data stores processing the AI/ML model. A data acquisition module is composite apparatus that intelligently fetches training data sets applicable to the particular AI/ML model in a distributed network and initiates intelligent retraining of the AI/ML model based on an aggregated regional training data set.

19 Claims, 7 Drawing Sheets

(56) References Cited

U.S. PATENT DOCUMENTS

2021/0125272 A1   4/2021  Sinharoy
2021/0319514 A1  10/2021  Jones
2022/0059190 A1   2/2022  Ahmed et al.
2024/0338571 A1* 10/2024  Marrero ................. G06N 5/022

OTHER PUBLICATIONS

Bellamy, "AI Fairness 360: An Extensible Toolkit for Detecting, Understanding, and Mitigating Unwanted Algorithmic Bias", 2018. (Year: 2018).*

* cited by examiner

ARTIFICIAL INTELLIGENCE/MACHINE LEARNING MODEL DECISIONING AND RECTIFICATION SYSTEM

BACKGROUND

Enterprise organizations utilize various artificial intelligence (AI) and machine learning (ML) models to automate and/or support products and/or services provided to users. For example, a financial organization may implement AI and ML models to support electronic services such as during loan decisioning, fraud detection, customer default prediction, and the like. A challenge facing these enterprise organizations is that many AI/ML models used din the industry may include a bias, or a perceived bias, that may influence a decision output from the model. In some cases, such problems may be caused by training models with an inadequate set of training data, which may induce unintended results. As such, a need has been recognized to improve AI/ML model decisioning processes that may be then be used to correct perceived model biasness in real time before erroneous decisions are made.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with artificial intelligence and machine learning models. In particular, one or more aspects of the disclosure relate to an AI/ML model decisioning improvement and rectification system to improve training of AI/ML models to improve decisioning outputs in real-time.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes improving real-time decisioning of AI/ML models used in products and/or services provided by an enterprise organization.

In many cases, AI/ML models may not be trained on an adequate set of training data, which may result in unintended model biasing. As such, an automatic method to allow for real-time user interaction to challenge a perceived biased decision and, in turn, improve the training of the AI/ML model to remove the perceived biasing in real-time. Because, high-quality training data is necessary to build a high-performing machine learning model, both in the early stages of model training and throughout the training process. The features, tags, and/or relevancy of training data are the "textbooks" from which a model will learn. Training data is used to train and retrain model throughout its use because the relevant data isn't fixed and evolves over time. For example, human language, word use, and/or corresponding definitions change over time, so there is need to update model with retraining periodically. In some cases, an IoT device may include AI/ML capability embedded in the device and may be used for making decisions for real time interactions with a user (e.g., a smart watch-based facial and/or voice recognition method that allows the user to book a travel ticket, a device to assist user onboarding to a product provided by an enterprise organization, and the like).

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
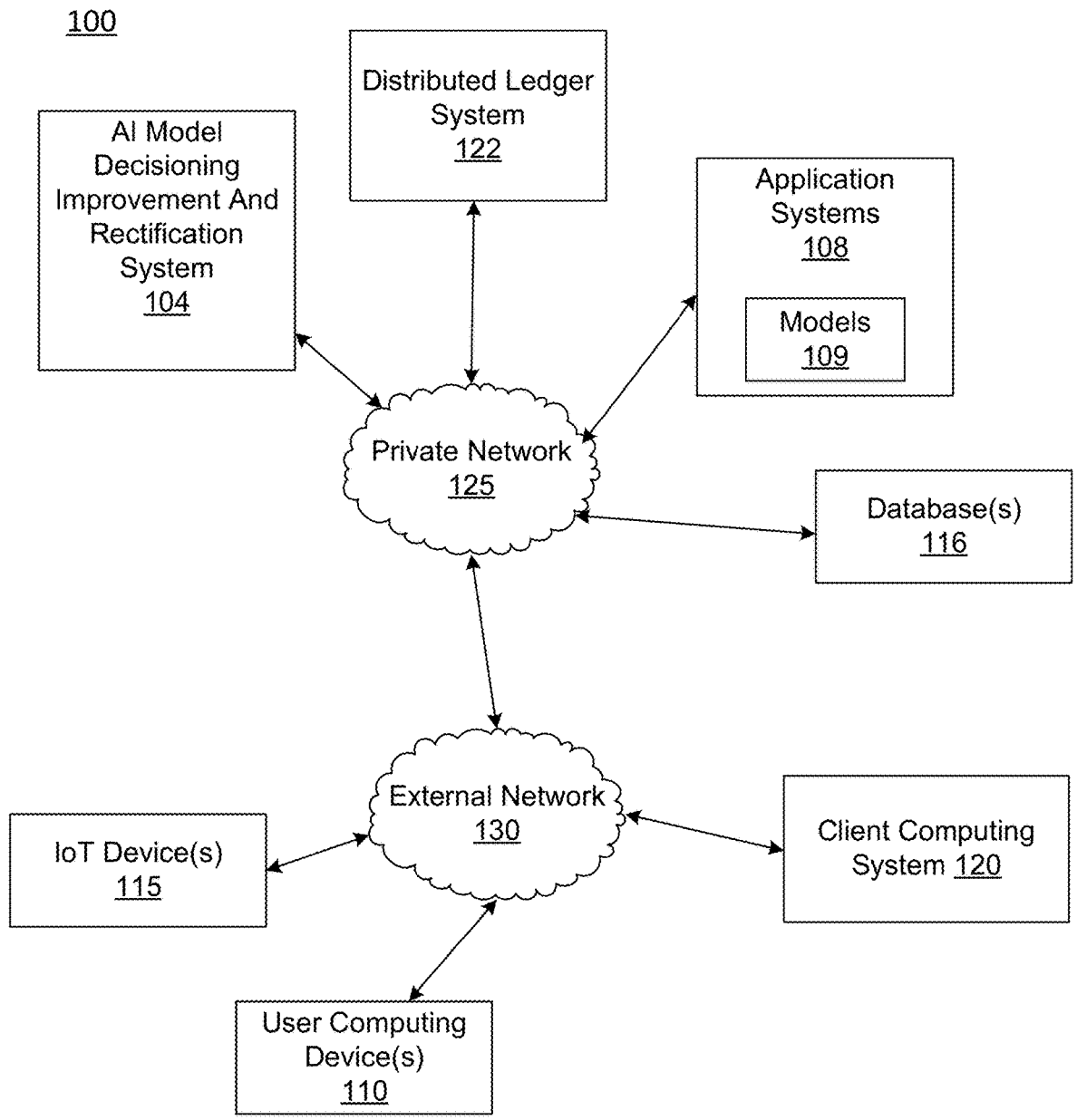
FIG. 1A shows an illustrative computing environment for improving operation of AI/ML model decisioning process within a distributed network, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Because AI/ML models rely upon training data sets to ensure proper training and operation, inadvertent erroneous decisions may result from use of incomplete test data sets. For example, training data may inadvertently include a small sample size or may reflect regional differences that may need future adjustment when the AI/ML model is implemented with a larger target market. An enterprise organization may utilize an intelligent AI-based system to allow individuals to challenge decisions made by other AI/ML models leveraged by the enterprise organization's products and services. For example, a user may initiate a real-time challenge or review of a decision that relied upon AI/ML model output, such as those to challenge perceived biased decisioning of a possibly mis-trained AI-ML model. Individuals may interact with an AI/ML model bias decisioning and rectification system to provide their feedback on model decisioning. In some cases, distributed secure ledger networks (e.g., a blockchain network, a Holochain network, and the like) may be used to provide feedback directed to an AI/ML model monitoring module. This input may trigger an AI/ML acquisition module to intelligently fetch relevant training data from a distributed network. The AI/ML acquisition model may utilize at least one of a quantum swarm intelligence engine and/or a data synthesis engine to process newly acquired training data to ensure minimization and/or elimination model biasness. The AI/ML acquisition module may be a composite apparatus that intelligently fetches training data sets applicable to a particular AI/ML model of interest from similar models in operation on the distributed network. For example, the AI/ML acquisition module may perform data acquisition in a secure manner, such as by using the quantum swarm intelligence engine and/or a data synthesis engine such as by leveraging distributed Holochain and/or cloud technology.

FIG. 1A shows an illustrative computing environment 100 for AI/ML model decisioning improvement and rectification system, in accordance with one or more arrangements. The computing environment 100 may comprise one or more devices (e.g., computer systems, communication devices, and the like). The computing environment 100 may comprise, for example, an AI/ML model decisioning improvement and rectification system 104, one or more application system 108, one or more database(s) 116, and/or a distributed ledger system 122. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120, one or more internet of things (IoT) devices 115, and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the distributed ledger system 122 as being incorporated within the private network 125, the distributed ledger system 122 may be implemented as a separate computing system communicating via the external network 130.

The AI/ML model decisioning improvement and rectification system 104 may comprise one or more computing devices and/or other computer components (e.g., processors, memories, communication interfaces) configured to perform one or more functions as described herein. Further details associated with the architecture of the AI/ML model decisioning improvement and rectification system 104 are described with reference to FIG. 1B.

The application system 108 and/or the client system 122 may comprise one or more computing devices and/or other computer components (e.g., processors, memories, communication interfaces). In addition, the application system 108 and/or the client system 122 may be configured to host, execute, and/or otherwise provide one or more enterprise applications. In some cases, the application systems 108 may host one or more services 109 configured facilitate operations requested through one or more API calls, such as data retrieval and/or initiating processing of specified functionality. In some cases, the client computing system 122 may be configured to communicate with one or more of the application systems 108 via API function calls and the services 109. In an arrangement where the private network 125 is associated with a financial institution (e.g., a bank), the application systems 108 may be configured, for example, to host, execute, and/or otherwise provide one or more transaction processing programs, such as an online banking application, fund transfer applications, and/or other programs associated with the financial institution. The client computing system 122 and/or the application systems 108 may comprise various servers and/or databases that store and/or otherwise maintain account information, such as financial account information including account balances, transaction history, account owner information, and/or other information. In addition, the client computing system 122 and/or the application systems 108 may process and/or otherwise execute transactions on specific accounts based on commands and/or other information received from other computer systems comprising the computing environment 100. In some cases, one or more of the client computing system 122 and/or the application systems 108 may be configured, for example, to host, execute, and/or otherwise provide one or more transaction processing programs, such as electronic fund transfer applications, online loan processing applications, and/or other programs associated with the financial institution.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application systems 108 and may receive decisions from the application systems 108 resulting from use of one or more AI/ML models 109. For example, the AI/ML models 109 may be trained based on use in a particular region and may be leveraged to perform similar decisioning functions in different regions.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the API route testing system 105. For example, the database(s) 116 may store API code of an API to be tested, API test classes, and the like. In an arrangement, the database(s) 116 may be used for other purposes as described herein. In some cases, the client computing system 120 may call one or more API functions to write data or read data to the database(s) 116 via the services.

In one or more arrangements, the AI/ML model decisioning improvement and rectification system 104, the distributed ledger system 122, the application systems 108, the client computing system 120, the client computing system 120, the user devices 110, the IoT devices 115, and/or the other devices/systems in the computing environment 100 may be any type of computing device capable of receiving input via a user interface, and communicating the received input to one or more other computing devices in the computing environment 100. For example, the AI/ML model decisioning improvement and rectification system 104, the distributed ledger system 122, the application systems 108, the client computing system 120, the client computing system 120, the user devices 110, the IoT devices 115, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the AI/ML model decisioning improvement and rectification system 104, the distributed ledger system 122, the application systems 108, the client computing system 120, the client computing system 120, the user devices 110, the IoT devices 115, and/or the other devices/systems in the computing environment 100 may, in some instances, be and/or comprise special-purpose computing devices configured to perform specific functions.

Figure 1B:
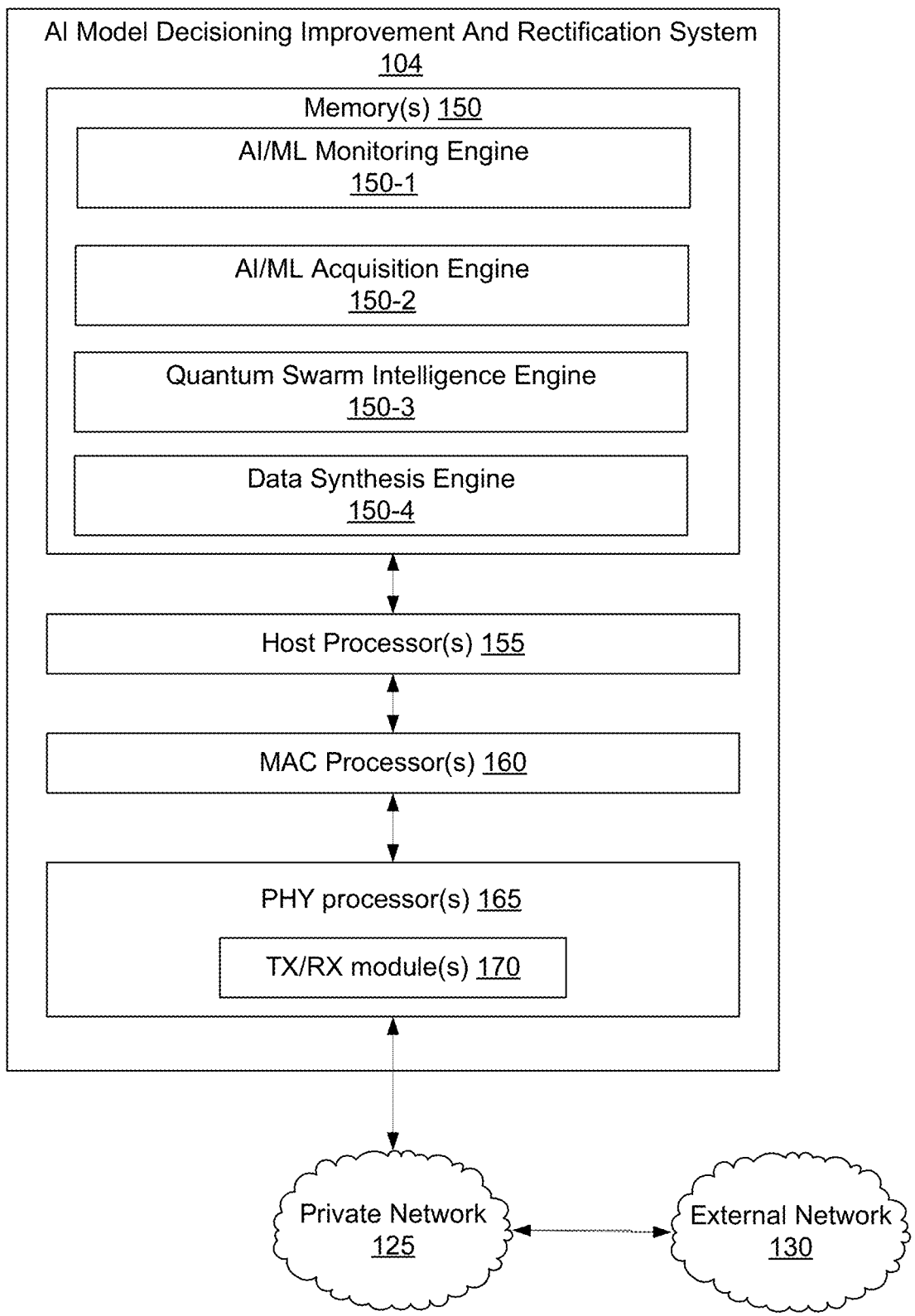
FIG. 1B shows an illustrative computing platform enabled for improving operation of AI/ML model decisioning process within a distributed network, in accordance with one or more aspects described herein.

FIG. 1B shows an illustrative the AI/ML model decisioning improvement and rectification system 104 in accordance with one or more examples described herein. The the AI/ML model decisioning improvement and rectification system 104 may be a stand-alone device and/or may at least be partial integrated with the AI/ML model decisioning improvement and rectification system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The API Route Testing System 105 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the API Route Testing System 105 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the AI/ML model decisioning improvement and rectification system 104 may be configured to execute machine readable instructions stored in memory 150. The memory 150 may comprise (i) one or more program modules/engines having instructions that when executed by the one or more processors cause the AI/ML model decisioning improvement and rectification system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the AI/ML model decisioning improvement and rectification system 104 and/or by different computing devices that may form and/or otherwise make up the AI/ML model decisioning improvement and rectification system 104. For example, the memory 150 may have, store, and/or comprise an AI/ML monitoring engine 150-1, an AI/ML acquisition engine 150-2, a quantum swarm intelligence engine 150-3, a data synthesis engine and/or the like. The AI/ML monitoring engine 150-1 may have instructions that direct and/or cause the AI/ML model decisioning improvement and rectification system 104 to monitor decisioning inquiries associated with improving decisioning operations and rectifying of decisioning errors, and the like. The AI/ML acquisition engine 150-2 may have instructions that may cause the AI/ML model decisioning improvement and rectification system 104 to trigger analysis of model decisioning and initiating rectification processes to improve model decisioning.

While FIG. 1A illustrates the AI/ML model decisioning improvement and rectification system 104 and/or the application systems 108, as being separate elements connected in the private network 125, in one or more other arrangements, functions of one or more of the above may be integrated in a single device/network of devices. For example, elements in the AI/ML model decisioning improvement and rectification system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application systems 108.

In some cases, the AI/ML model decisioning improvement and rectification system 104 may utilize a secure ledger system (e.g., a Holochain-based distributed apparatus) to challenge AI/ML model decisions in real-time. For example, the distributed ledger system may be used to route model biasness challenges. In some cases, the AI/ML model decisioning improvement and rectification system 104 may be an intelligent system that senses problematic AI/ML model decisioning results (e.g., biasness) in real-time and may extract AI/ML training data from one or more distributed systems (e.g., IoT devices, source systems, and the like) and may tune AI/ML models to resolve the errors. A secure mechanism to extract training data in a distributed environment may be used such as to anonymize data and the like. In some cases, a user input to challenge a model-based decision may initiate real-time dynamic updating of AI/ML models. For example, a real-time mechanism to detect customer interaction issues may be received via a communication received from edge devices (e.g., IoT devices 115) via distributed ledger (e.g., a Holochain) that may be interconnected with an IoT-enabled mesh network of models. In some cases, a user may use edge devices to interact with each decentralized node based on the user's individual needs. This may leverage IoT functionality by allowing cross-border model training data to be built for use during training a model and based on distributed geo-location-based models. In some cases, the quantum swarm intelligence module may allow for novel ways to consume computational power based on data needs. For example when a node receives customer input from an upstream channel, the receipt will trigger a configured geolocation-based chain of models to assemble a training data set, where the training data set be dependent upon local AI policies (e.g., "ethical AI" policies) and may provide the training data as an input to an AI-challenge model. The AI challenge model may act as an engine associated with each distributed ledger node, to initiate real-time model integration based on interaction to overcome user identified issues. Incoming IOT training data may be synthesized autonomously based on International Ethical AI policies or rules before integrating formerly local data into other regional or international standard based models. The quantum swarm AI intelligence engine may decide an amount of computational power of each incoming model training data request. as required to process the data.

Figure 2:
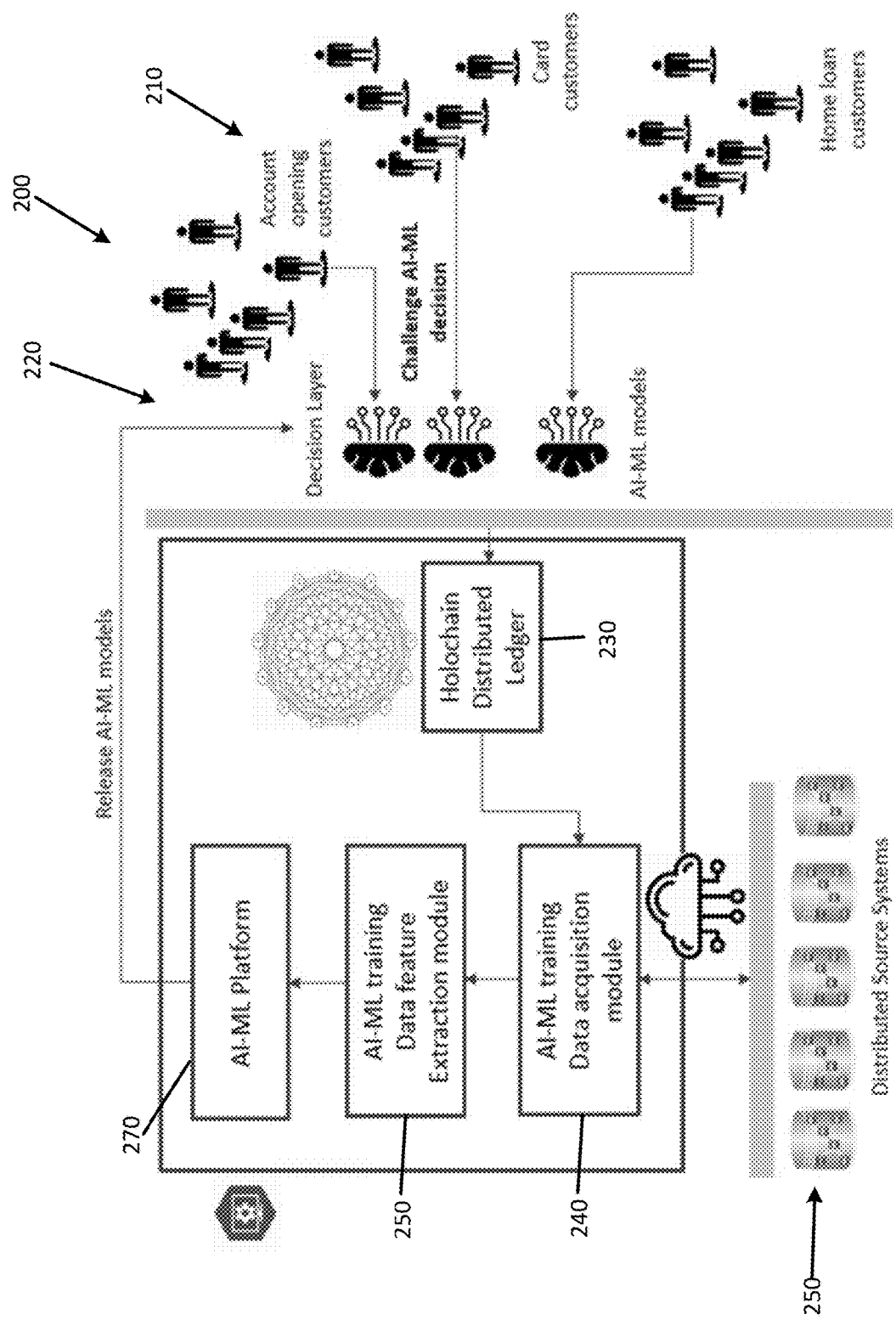
FIGS. 2 and 3 show illustrative distributed computing network for improvement management of multiple AI/ML models in accordance with one or more aspects described herein.
Figure 3:
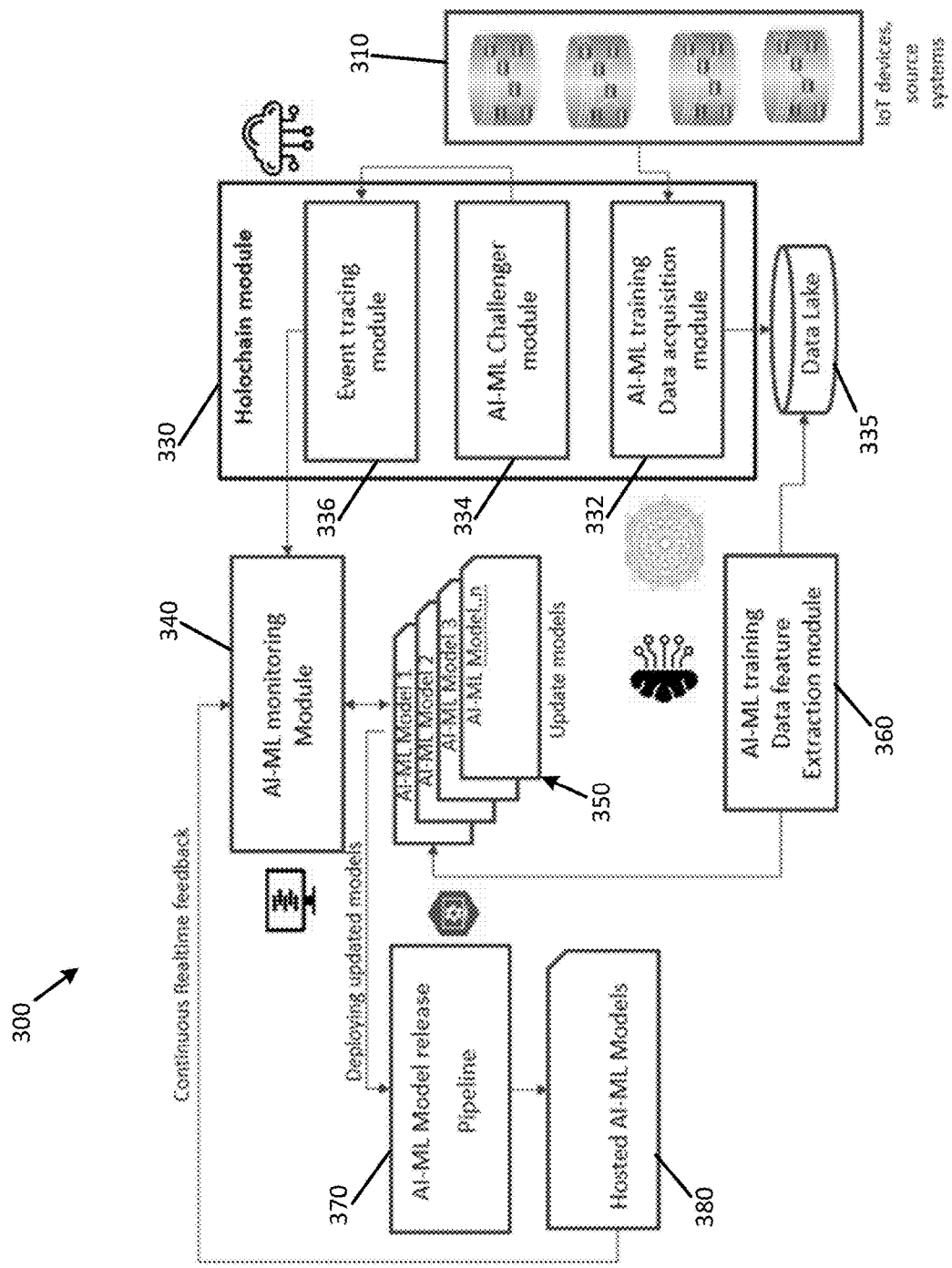

FIGS. 2 and 3 show illustrative views of an AI/ML model decisioning improvement and rectification system in accordance with one or more aspects described herein. For example, FIG. 2 shows an AI/ML model decisioning improvement and rectification system 200 where one or more users 210 may challenge a decision output by a service or product utilizing an AI/ML model. For example, the user request may be input via a decision layer 220 and input into a distributed ledger system (e.g., a Holochain distributed ledger 230). An AI/ML training data acquisition module 240 may receive an input from the Holochain distributed ledger 230 that may cause the AI/M training data acquisition module to acquire model data from two or more distributed source systems. For example, model data used for training similar models, such as models used for qualifying users for opening an account, obtaining a credit card, initiating a loan application and/or the like, that may be used in different geographic regions (e.g., countries, portions of countries, and the like) may be acquired for analysis. Relevant data may be extracted from the acquired data by the AI-ML training data feature extraction module, such as data having parameters similar to one or more parameters of the user input data. This data may then be used to train the AI/ML platform for further use by the applications. The updated models may then be activated in the decisioning layer 220.

The system 300 of FIG. 3 shows another view of an illustrative system performing a similar function as described for system 200 of FIG. 2. Here, a user may utilize an IoT device 310 to provide an input into the system, such as to initiate a decisioning request (e.g., electronically apply for a loan or credit card, or the like) and/or to initiate a challenge regarding an unfavorable output that may have been caused by a mis-trained model (e.g., a model exhibiting an inadvertent training bias). For example, the IoT device 310 may provide an input to a distributed ledger system, such as a system processing a Holochain module 300. The Holochain module may include an AI/ML training data acquisition module to manage communication with one or more model information data stores (e.g., the "data lake" 335). If the user initiates a challenge of an application decision, the AI/ML challenger module 334 may receive the input from the IoT device 310 and trigger operation of an event tracing module 336 to initiate monitoring of the AI/ML model operation within the application, such as by the AI/ML monitoring module 340.

The AI/ML monitoring module 340 may monitor operation of multiple AI/ML models operating in a hosted application and may, with a AI/ML model release pipeline, assist in the deployment of versions of the AI/ML models 350 to be used with one or more hosted AI/ML models 380 in use by an application or service. Operation of the hosted AI/ML models 380 may be monitored by the AI/ML monitoring module 340 to receive continuous real-time feedback regarding model operation and/or facilitate update of the AI/ML models 350 while coordinating use of information received from the AI/ML training data feature extraction module 360.

Figure 4:
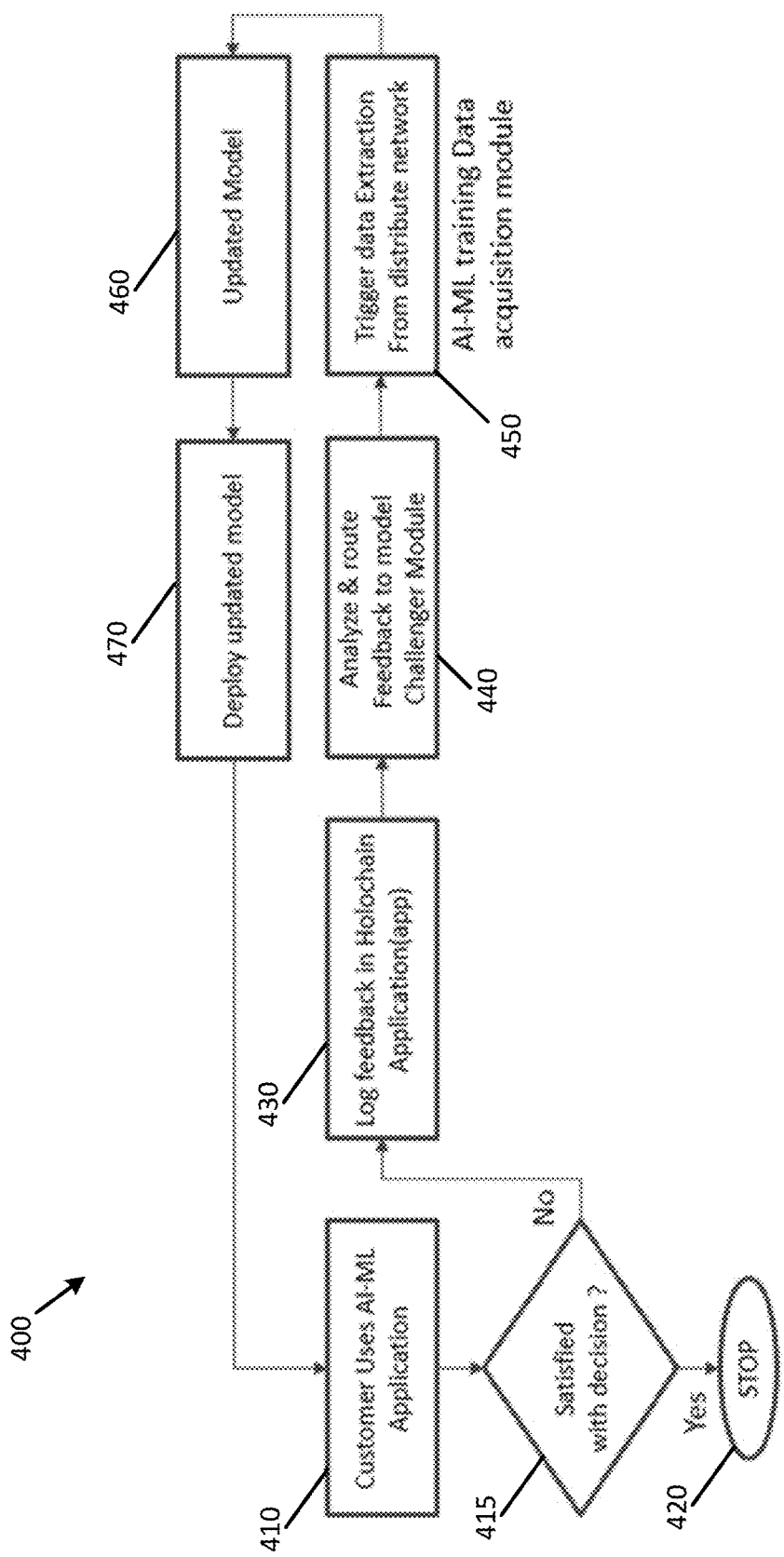
FIG. 4 shows an illustrative process for improvement management of multiple AI/ML models, in accordance with one or more example arrangements.

FIG. 4 shows an illustrative process to perform AI/ML model decisioning improvement and rectification processes 400. At 410, a user may access and use an application or hosted service provided by an enterprise organization to facilitate use of the product or service. For example, the user may access a loan application service, credit card application service, a consumer account application service and/or the like. Such services may utilize AI/ML models to perform particular tasks required by the service to output a result. Upon completion of the action (e.g., a loan application) the user may review results of the service (e.g., a denial of a loan application or the like) at 415. If, at 415, the user is satisfied, the process stops at 420. If, at 415, the user is not satisfied with the result, the user may initiate a review of the model operation for unintended biases or other faulty operation, such as by sending an input via an IoT device. At 430, the review initiation input may be logged as feedback in a distributed ledger (e.g., a holochain application).

At 440, the feedback received from the user and logged in the distributed ledger may be analyzed and, if an indication that the AI/ML model may be improperly trained, the feedback may be routed to an analysis device, such as a model challenger module and/or an AI/ML model decisioning improvement and rectification system. At 450, receipt of the routed input, the AI/ML training data acquisition module may trigger data extraction of AI/ML model information from the distributed network. At 460, once analyzed the data retrieved, the AI/ML model may be retrained or otherwise updated. At 470, the updated model may be redeployed with associated applications and the user may be contacted, or otherwise alerted of the update, and may re-access the application to rerun the process 400.

Figure 5:
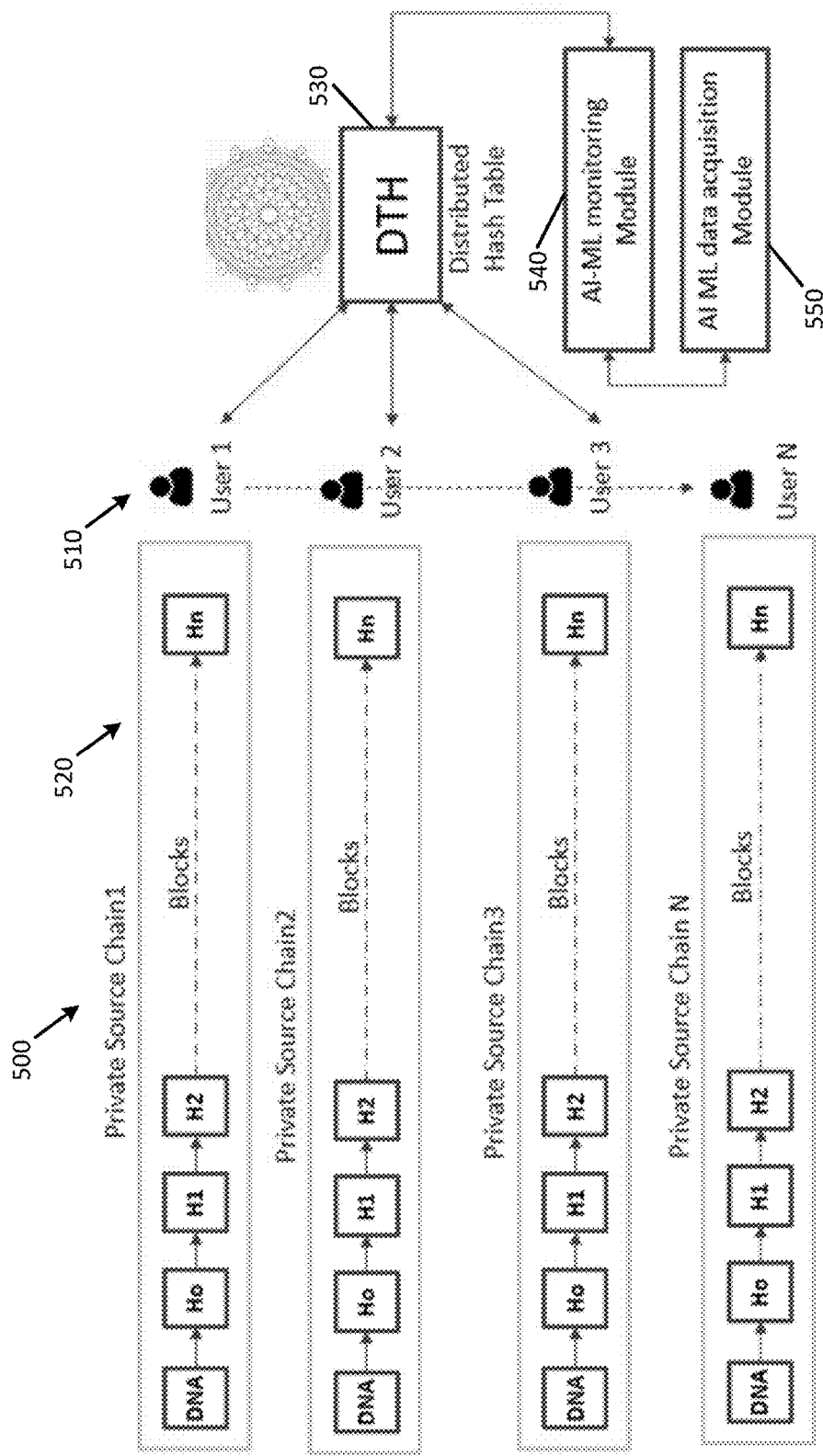
FIG. 5 shows illustrative distributed secured information systems in accordance with one or more aspects described herein.

FIG. 5 shows use of a distributed ledger system in accordance with one or more aspects described herein. In the system 500 of FIG. 5, the distributed ledger system may include a distributed hash table (DTH) 530 linked to one or more private source chains 520, each being associated with a different user 510. The private source chains may be accessed, either directly or indirectly by the user, via one or more devices such as an IoT device, a personal computing device and the like. In some cases, each private source chain may be stored separately or collectively within one or more devices of an IoT computing system, a distributed data source computing system, or the like. As discussed above, a feedback request may be logged in the distributed ledger system as an entry in a private source chain, along with other decision results associated with the user including, for example, results of decisioning actions corresponding to applications utilizing AI/ML models in the decisioning process. The AI/ML monitoring module 540 and/or the AI/data acquisition module 550 may access the private source chain information via the DTH 530.

Figure 6:
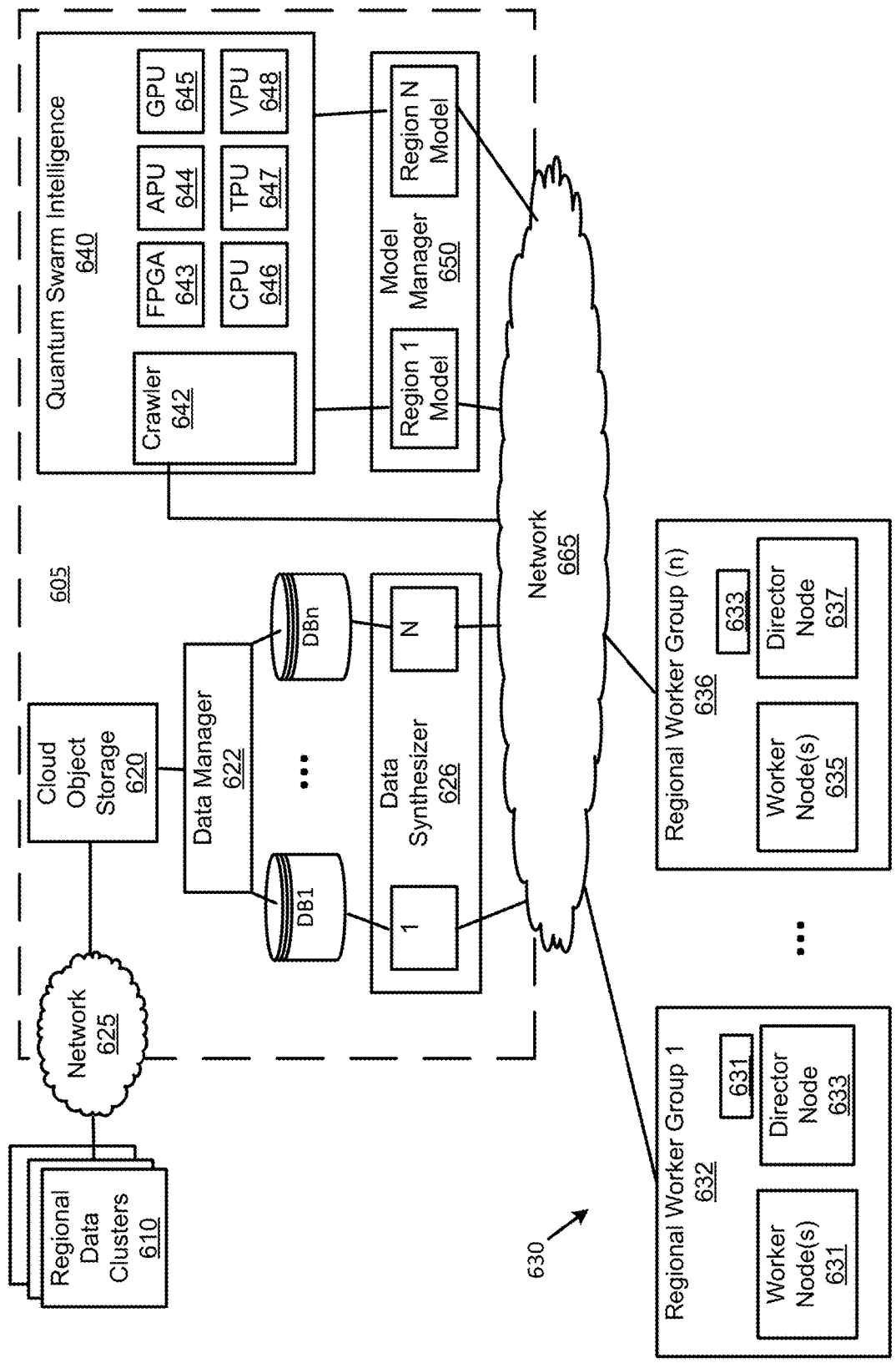
FIG. 6 shows an intelligent system to challenge AI-ML model decisioning and provide automatic rectification through orchestrated training data acquisition from a distributed network according to aspects described herein.

FIG. 6 shows an intelligent system to challenge AI-ML model decisioning and provide automatic rectification through orchestrated training data acquisition from a distributed network according to aspects described herein. A cloud computing system 605 may be communicatively coupled to one or more regional data clusters 610 via a network 625 (e.g., the Internet). Data from each of the regional data clusters 610 may be collected by and/or uploaded to a cloud storage object 620, where a data manager 622 may split the data into one or more data storage databases DB1 . . . DBn. In some cases, each database DB1 . . . DBn may store at least a portion of data aggregated from each of the regional data clusters 610, such that regional data from each region is available for training models. A data synthesizer 626 may coordinate communication of the data one or more regional worker group clusters 632, 636 via a network 665. Each regional worker group cluster 632, 636 includes worker nodes 631, 635 and director nodes 633, 637. The regional worker group clusters 632 636 may train and/or utilize AI/ML models based on data received from the cloud computing system 605 and may be associated with a different geographical region (e.g., the United States of America, the United Kingdom, India. and the like). A quantum swarm intelligence system 640 may include a crawler 642 that may autonomously choose computing component power to analyze regional model operation and/or provide available computing resources to retrain the AI/ML model 661, 663 operating in one or more regions. The crawler 642 may assign computing power of an field programmable gate array (FPGA) group 643, an accelerated processor unit (APU) group 644, a graphics processing unit (GPU) group 645, a central processing unit (CPU) group 646, a tensor processing unit (TPU) group 647, a vector processing unit (VPU) group 648, and/or the like to process model information based on computing power availability, timing requirements, data throughput requirements, priority requirements, and the like In some cases, model weights may be applied, by a model manager 650, to each region's model parameters and/or data for application and activate and update the models 631, 633 for use in each regional worker group cluster 632, 636. The model manager 650 may store and/or share model weighting parameters and/or other regional model information to coordinate cross-regional sharing of training data. When updated the models 631 may be trained with cross border synthesis data to correct for regional differences in training data corresponding to individual differences between regional populations, laws, customs, and other information that may inadvertently mis-train models that may have caused perceived biases within results output in the models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device.

The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a plurality of regional application servers, each application server of the plurality of application servers processing instructions that, when executed by a processor, cause a first application server to:
receive, via a first user interface, user input information requesting operation of a service facilitated by operation of the first application server;
processing, by an artificial intelligence/machine learning (AI/ML) model, the user input information; and
outputting, based on output of the AI/ML model, a decision;
an AI/ML model decisioning and rectification system comprising:
a processor; and
memory storing instructions that, when executed by the processor, cause the AI/ML model decisioning and rectification system to:
receive, via a second user interface, an input request to review the decision output by the AI/ML model;
retrieve, based on the received input request and via a network, training data from a second application server processing the same AI/ML model, wherein data processed by the first application server is different than data processed by the second application server;
send, via the network to the first application server, a request to update the AI/ML model based, at least in part, on information received from the second application server;
assemble, based on the information received from the second application server and from a geolocation-based chain of models, a re-training data set corresponding to local AI policies;
retrain, via the network and based on the request to update the AI/ML model, using the re-training data set; and
initiate, by the first application server, processing of the user input information by the updated AI/ML model.

2. The system of claim 1, wherein the instructions further cause the AI/ML model decisioning and rectification system to:
retrieve, via the network, first information from a first regional data store associated with the first application server; and
retrieve, via the network, second information from a second regional data store associated with the second application server.

3. The system of claim 2, wherein the instructions further cause the AI/ML model decisioning and rectification system to train the AI/ML model based on the first information from the first regional data store and the second information from the second regional data store.

4. The system of claim 3, wherein the instructions further cause the AI/ML model decisioning and rectification system to activate, via the network, the trained AI/ML model at the first application server.

5. The system of claim 3, wherein the instructions further cause the AI/ML model decisioning and rectification system to activate, via the network, the trained AI/ML model at both the first application server and the second application server.

6. The system of claim 1, further comprising an Internet of things (IoT) device, wherein the IoT device comprises a user interface, wherein the user interface receives the input request to review the decision output by the AI/ML model and the IoT device communicates the input request to the AI/ML model decisioning and rectification system.

7. The system of claim 6, wherein the IoT device is communicatively coupled to a distributed ledger, wherein communication of the input request to the AI/ML model decisioning and rectification system comprises storing the input request in a block of the distributed ledger.

8. The system of claim 7, wherein the distributed ledger comprises a private source chain associated with a user.

9. The system of claim 1, further comprising a quantum swarm intelligence system configured to assign computing power to analyze and train regional models on cross-regional data.

10. The system of claim 1, wherein the instructions further cause the AI/ML model decisioning and rectification system autonomously synchronize regional data stores.

11. An artificial intelligence/machine learning (AI/ML) model decisioning and rectification system, comprising:
 a processor; and
 memory storing instructions that, when executed by the processor, cause the AI/ML model decisioning and rectification system to:
  receive, via a user interface, an input request to review decision output by an AI/ML model processed by a first regional application server, wherein the decision output by the AI/ML model of the first regional application server is output by the AI/ML model, in response to a user input request information received by the first regional application server to analyze operation of a service facilitated by operation of the first regional application server;
  retrieve, based on the received input request and via a network, training data from a second regional application server processing the same AI/ML model, wherein the first regional application server is geographically located in a different geographic region from the second regional application server;
  send, via the network to the first regional application server, a request to update the AI/ML model based, at least in part, on information received from the second regional application server;
  assemble, based on the information received from the second regional application server and from a geolocation-based chain of models, a re-training data set corresponding to local AI policies;
  retrain, via the network and based on the request to update the AI/ML model, using the re-training data set; and
  initiate, by the first regional application server, processing of the user input information by the updated AI/ML model.

12. The AI/ML model decisioning and rectification system of claim 11, wherein the instructions further cause the AI/ML model decisioning and rectification system to:
 retrieve, via the network, first information from a first regional data store associated with the first regional application server; and
 retrieve, via the network, second information from a second regional data store associated with the second regional application server.

13. The AI/ML model decisioning and rectification system of claim 12, wherein the instructions further cause the AI/ML model decisioning and rectification system to train the AI/ML model based on the first information from the first regional data store and the second information from the second regional data store.

14. The AI/ML model decisioning and rectification system of claim 13, wherein the instructions further cause the AI/ML model decisioning and rectification system to activate, via the network, the trained AI/ML model at the first regional application server.

15. The AI/ML model decisioning and rectification system of claim 13, wherein the instructions further cause the AI/ML model decisioning and rectification system to activate, via the network, the trained AI/ML model at both the first regional application server and the second regional application server.

16. The AI/ML model decisioning and rectification system of claim 11, wherein the instructions further cause the AI/ML model decisioning and rectification system to receive from an Internet of things (IoT) device, the input request to review the decision output by the model and the IoT device communicates the input request to the AI/ML model decisioning and rectification system.

17. The AI/ML model decisioning and rectification system of claim 16, wherein the IoT device is communicatively coupled to a distributed ledger, wherein communication of the input request to the AI/ML model decisioning and rectification system comprises storing the input request in a block of the distributed ledger.

18. The AI/ML model decisioning and rectification system of claim 17, wherein the distributed ledger comprises a private source chain associated with the user.

19. The AI/ML model decisioning and rectification system of claim 11, wherein the instructions further cause the AI/ML model decisioning and rectification system autonomously synchronize regional data stores.

* * * * *